United States Patent [19]

Mir

[11] Patent Number: 4,459,615
[45] Date of Patent: Jul. 10, 1984

[54] TWO-DIMENSIONAL, ELECTRO-OPTIC ELEMENT ADAPTED FOR STATIC ADDRESS AND COOPERATIVE DEVICE, METHODS AND APPARATUS FOR ELECTRONIC IMAGING

[75] Inventor: José M. Mir, Rochester, N.Y.
[73] Assignee: Eastman Kodak Company, Rochester, N.Y.
[21] Appl. No.: 394,351
[22] Filed: Jul. 1, 1982
[51] Int. Cl.³ .................... H04N 1/00; H04N 3/00
[52] U.S. Cl. ............................ 358/230; 358/236
[58] Field of Search ............... 358/60, 61, 75, 230, 358/231, 236; 355/5, 18; 353/20; 350/374, 392, 397, 398, 400

[56] References Cited
U.S. PATENT DOCUMENTS

| | | | |
|---|---|---|---|
| 3,901,584 | 8/1975 | Yamazaki | 350/392 |
| 4,222,638 | 9/1980 | Robert | 350/374 |
| 4,380,023 | 4/1983 | Mir | 358/75 |

Primary Examiner—Michael A. Masinick
Attorney, Agent, or Firm—Raymond L. Owens

[57] ABSTRACT

Static electrical-field address of an electro-optic panel having opposing first and second dielectric surfaces sandwiching a two-dimensional light-modulating region is accomplished by: (i) applying a reference potential sequentially to successive lines of the first surface and (ii) applying, in synchronism with each such reference potential application and in accordance with image line information, separate signal potentials to the plurality of discrete pixel address zones located along a line of the second surface that is directly opposite such reference potential application. A two-dimensional electrostatic charge pattern corresponding to the image is formed on the one surface. Thereafter, ground potential is applied to portions of the first surface contiguous the charge pattern and portions of the second surface directly opposite the charge pattern.

9 Claims, 9 Drawing Figures

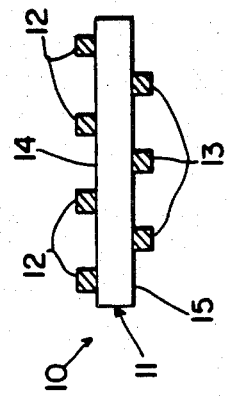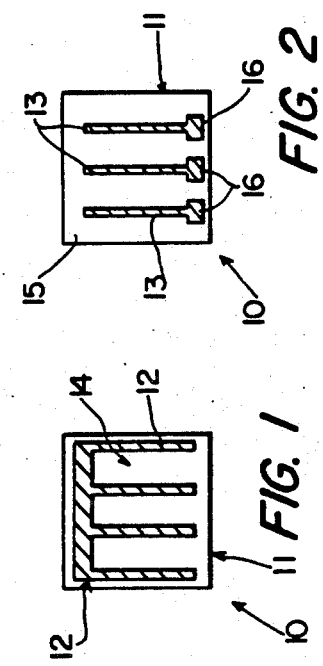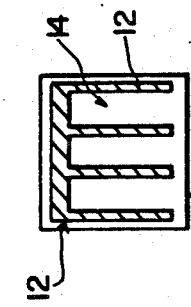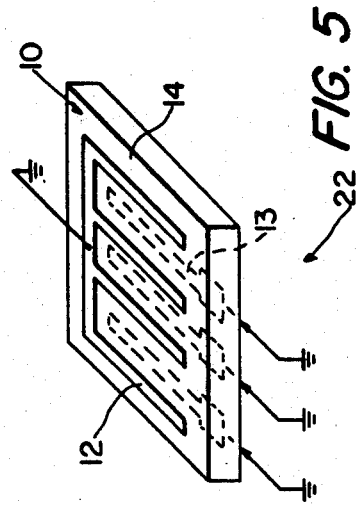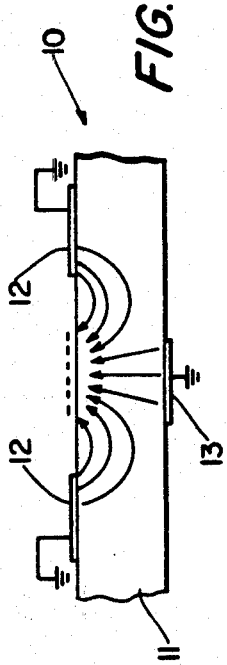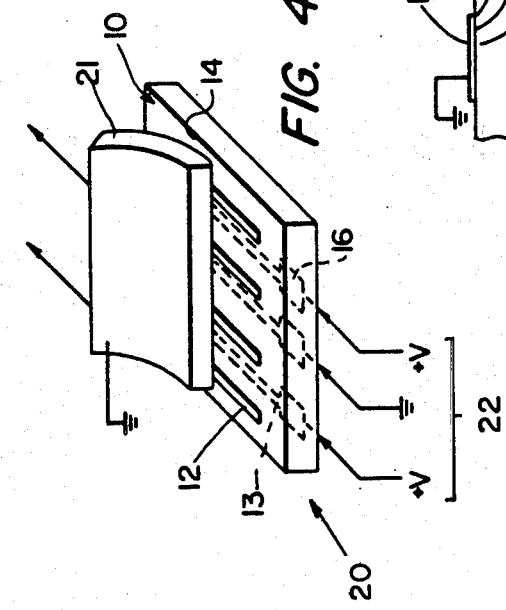

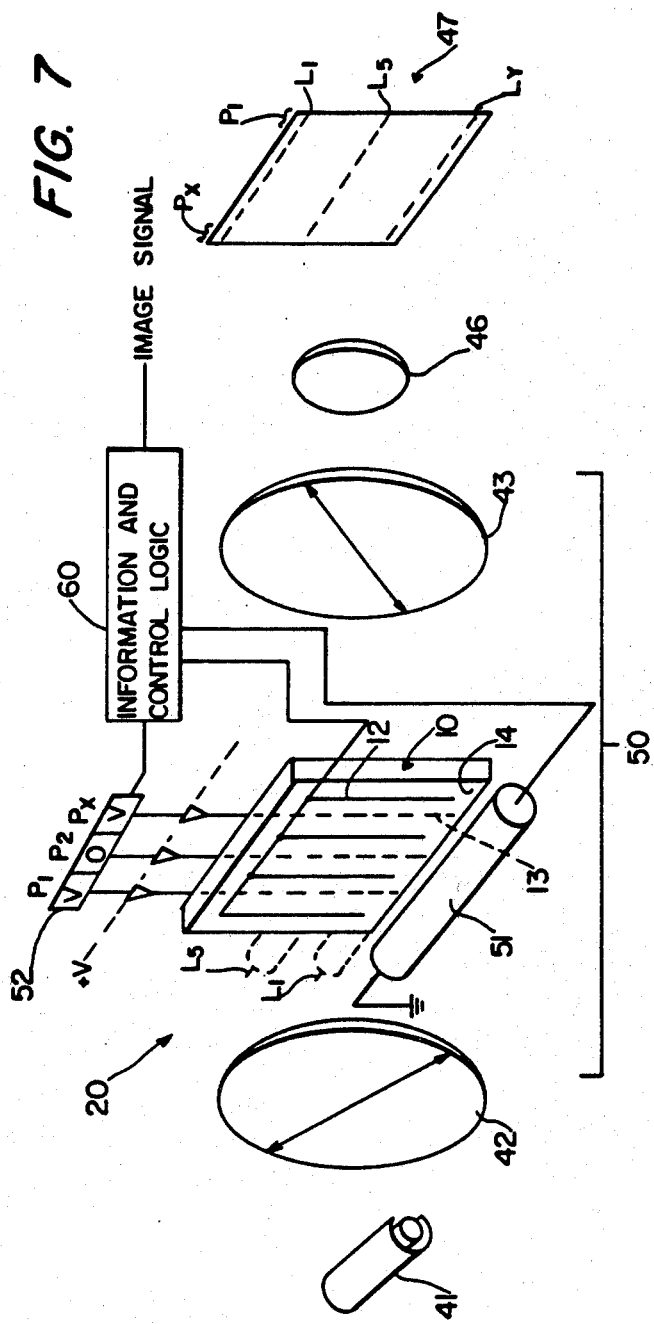
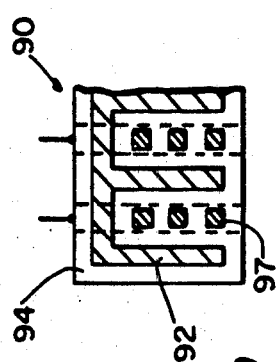
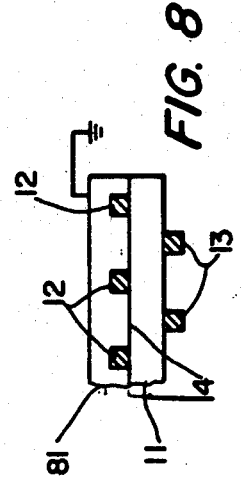

TWO-DIMENSIONAL, ELECTRO-OPTIC ELEMENT ADAPTED FOR STATIC ADDRESS AND COOPERATIVE DEVICE, METHODS AND APPARATUS FOR ELECTRONIC IMAGING

BACKGROUND OF THE INVENTION

1. Field of the Invention

The present invention relates to electro-optic elements and devices for use in static, two-dimensional imaging (e.g. display or printing) and more particularly to improved electrical addressing features of such elements and devices and to related imaging apparatus and methods.

2. Description of Prior Art

For many years there have been extensive development efforts relating to electro-optic elements of the kind that are addressable by electric field patterns to provide light-modulating image patterns. Many different kinds of elements have evolved from such efforts, e.g. panels of dipole particles in a liquid suspension or elastomeric matrix, panels of liquid crystal material and panels of ferroelectric ceramic material such as PLZT. Generally, in the presence of an image field pattern, these panels exhibit a change of a light-modulating characteristic(s), e.g. a change in light transmission, reflectivity or birefringence.

The problem of generating and maintaining the desired electric field pattern on such electro-optic panels have received a substantial portion of the development work in this area, and a number of different approaches have been described in the prior art. One general approach is to provide an x-y electrode grid across the operative area of the panel and to address picture element (pixel) portions of the panel, a line at a time, with the desired electrical field pattern. This does not provide a truly static field pattern on the panel; however, the lines can be readdressed repeatedly within small time periods so that the light modulation effect of a panel addressed in this manner appears static to the eye. See e.g. U.S. application Ser. No. 230,097 entitled "Electronic Imaging Apparatus with Light Valve Area Arrays" and filed Jan. 29, 1981 in the names of Mir, Kurtz and Varner, now U.S. Pat. No. 4,320,023, issued Apr. 12, 1983.

A common addressing approach for providing a truly static two-dimensional field pattern is to provide a photoconductor layer overlying the operative panel area and to address the panel with a light image pattern under conditions creating the desired electrical field pattern. This approach requires imagewise optical addressing, and therefore it is redundant where the aim is to use the electro-optic device to form an optical image directly from electrical signals. Also, care must be taken when viewing the image so that the photoconductor is not discharged.

Another common approach is to imagewise address electro-optic panels with an electron beam or corona styli to create the desired electrostatic charge pattern across the operative panel area. Such addressing is complex from an apparatus viewpoint, particularly when images of relatively high resolution are desired.

The recent developments in thin film transistor technology provide a potential for truly static address of a plurality of electrodes located across the operative area of an electro-optic panel. However, at present such devices are difficult to fabricate on electro-optic material substrates. Also, good yield in fabrication is a problem for high resolution uses. Such devices require a refreshing address when used for an extended period.

SUMMARY OF THE INVENTION

One significant purpose of the present invention is to facilitate new and advantageous electrical address of two-dimensional electro-optic panels for static imaging (e.g. display or printing). One advantage of the present invention is its relative simplicity from both structural and functional viewpoints. Another advantage of the present invention is that it does not require any optical-address inputs so that it has low susceptibility to light during viewing or exposure operations. Another advantage of the present invention is that it provides (e.g. with a PLZT material panel and sandwiching, respectively crossed polarizers) static, two-dimensional images of good contrast. Yet another advantage of the present invention is that its electrical address can be accomplished with relatively high line frequency rates (e.g. 100 Hz and beyond). Practice of the present invention does not require a memory material and with electro-optic materials such as PLZT devices of the present invention have extended refresh periods, e.g. several hours.

In one aspect of the present invention the above and other advantages are accomplished, using an electro-optic panel of the kind having opposing first and second dielectric surfaces sandwiching a two-dimensional light-modulating region, by: (i) applying a reference potential sequentially to successive lines of the first surface and (ii) applying, in synchronism with each such reference potential application and in accordance with image line information, separate signal potentials to the plurality of discrete pixel address zones located along a line of the second surface that is directly opposite such reference potential application so that a two-dimensional electrostatic charge pattern corresponding to the image is formed on the one surface. Thereafter, ground potential is applied to portions of the first surface contiguous the charge pattern and portions of the second surface directly opposite the charge pattern.

In another aspect, one preferred light-modulating element comprises an electrically-insulative electro-optic panel having (i) a plurality of linear reference electrodes located in a generally parallel and uniformly spaced relation proximate the first panel surface and (ii) a plurality of linear signal electrodes located proximate the second panel surface in a generally parallel and interleaved relation with the normal projections through the panel thickness, of the reference electrodes.

In another aspect, imaging apparatus in accord with the present invention comprises the light-modulating element and means for electrically addressing it as described above in combination with means for directing uniform illumination along an optical path into the panel and first and second, respectively crossed, polarizing means sandwiching the panel along the optical path.

BRIEF DESCRIPTION OF THE DRAWINGS

The subsequent detailed description of preferred embodiments of the invention refers to the attached drawings wherein:

FIGS. 1 and 2 are respectively top and bottom plan views of one embodiment of electro-optic element for practice of the present invention;

FIG. 3 is a cross-sectional view of the FIGS. 1 and 2 element;

FIGS. 4 and 5 are perspective views illustrating structures and procedures for practicing one preferred embodiment of the present invention;

FIG. 6 is a schematic diagram illustrating an exemplary field pattern achieved by address of the present invention;

FIG. 7 is a perspective schematic view of one electronic imaging apparatus in accord with the present invention;

FIG. 8 is a cross-sectional view of a portion of one alternative embodiment of electro-optic element for practice of the present invention; and FIG. 9 is a plan view illustrating another alternative embodiment for electro-optic elements according to the present invention.

DETAILED DESCRIPTION OF THE PREFERRED EMBODIMENTS

FIGS. 1–3 illustrate one preferred embodiment of an electro-optical element 10 useful for static, two-dimensional light modulation in accordance with the present invention. The element 10 in general comprises an electro-optic panel 11 (of the kind wherein individual pixel portions are adapted to modulate light selectively in accordance with the application of an electric field) and predeterminedly configured electrode constructions 12 and 13 located respectively on opposing panel surfaces 14 and 15.

One preferred construction for panel 11 is a PLZT (lanthanum doped lead zirconate titanate) ceramic material which, in the presence of a transverse electrical field, changes from a non-polar, isotropic state to a polar, birefringent state. Such a panel can be used, e.g. in cooperation with sandwiching respectively crossed polarizing means, to control light transmission in response to applied electric fields. However, other electro-optic panel constructions, e.g. such as mentioned in the description of the prior art section above, are useful in accordance with the present invention to provide similar or different light modulation effects.

It is important in accord with the present invention that the surfaces 14 and 15 have a generally dielectric, i.e. electrically insulative, characteristic. It is highly preferred that the volume of the operative electro-optic region of the panel (between surfaces 14 and 15) also be dielectric to prevent discharge of fields created within the panel. PLZT material is a preferred panel material and exhibits these properties. Preferred panel thicknesses are of the same order of magnitude as the reference electrode spacings discussed below.

In accordance with the embodiment of the present invention shown in FIGS. 1–3, the electrode construction 12 on dielectric surface 14 comprises a plurality of linear electrodes (herein termed reference electrodes for reasons described below) located in a generally uniformly spaced, parallel relation. It should be noted at this stage that, for clarity of explanation, the number of electrodes and spacings shown in the drawings are not representative of what is normally used in actual imaging applications. That is, the panel 11 can have an actual operative area corresponding to the two-dimensional image pattern, and the number and spacing of electrodes 12 can be selected to provide the desired resolution for the image. Thus, in one useful embodiment, the spacing between electrodes 12 defines a pixel width for the desired image resolution. Electrodes 12 of the reference electrode construction can be commonly coupled as shown in the drawings or separate. Certain advantages pertain to the coupled reference electrode construction shown in FIG. 1 as will be more apparent subsequently.

The electrodes 13 (herein termed signal electrodes for reasons described below) are located on the opposing dielectric surface 15 generally parallel to electrodes 12 and in interleaved relation with the projections (normally through the panel thickness) of electrodes 12. Each signal electrode 13 is separately addressable and comprises a contact pad 16 for coupling to a source of activating voltage.

Referring now to FIGS. 4 and 5, preferred constructions and procedures for providing static, two-dimensional electrical address with a light-modulating device 20, will be described. In general, device 20 includes electro-optic element 10, line enable electrode means 21 and electrode line address means 22. As indicated schematically by the arrows in FIG. 4, line enable electrode 21 is constructed to move in a direction generally parallel to signal electrodes 13 and to sequentially apply a reference potential (here ground) to successive lines on dielectric surface 14. At each line stage of this movement, i.e. while reference potential is applied at a given line on surface 14, signal electrodes 13 on opposing surface 15 are all selectively addressed by line address means 22. That is, line address means selectively applies a voltage $+V$ or no-voltage (ground) in accordance with the image information pertaining to that line. These procedures cooperatively cause an induced electrostatic charge to be formed selectively on pixel portions of each line (i.e. portions of each line between electrodes 12) in accordance with the image information pertaining to that line. When each line has been so addressed, electrostatic charges reside on surface 14 in a static, two-dimensional pattern corresponding to the successive lines of image information electronically input by the repetitive activations of signal electrodes 13.

It is important that the electrode 21 be adapted to inject charge onto surface 14. Thus electrode 21 should be electrically conductive and adapted for closely spaced or contacting movement across surface 14. A highly preferred structure for electrode 21 provides a slightly resilient contact surface to enhance close spacing and or contact. Another highly preferred feature of the electrode 21 is a sharp contacting edge which enhances charge injection and maintains sharp resolution for line address.

Referring to FIG. 5, the next stage of the field generating procedure is to ground both the signal and reference electrodes. The transverse electric field provided to an activated pixel portion of the panel 11 by an induced electrostatic charge and surrounding grounded electrodes 12 and 13 is shown in FIG. 6. A reference potential other than ground, which maintains a transverse electric field distribution within the panel such as illustrated, can also provide equivalently useful results.

The function(s) of the device 20 will be further understood by consideration of its operation in the electronic imaging apparatus 40 shown in FIG. 7. In that imaging apparatus light source 41 is located to direct uniform illumination through a two-dimensional light valve array 50, which includes light-modulating device 20 and sandwiching, respectively crossed polarizing means 42 and 43. Lens means 46 images the pattern of light passing the light valve array 50 at image zone 47, which can be, e.g., a display surface or a support surface for a light-sensitive recording media.

To commence an imaging operation, line enable electrode 51 (here a roller electrode making line contact with the dielectric surface 14 of element 10) is moved to sequentially apply ground potential successively to lines on surface 14 (e.g. see $L_1$ and $L_5$ in FIG. 7). In synchronism with the movement of roller 51, control logic 60 provides pixel address information (for each line of an image to be displayed or recorded) to line address means 52, e.g. a serial-in/parallel-out shift register. The data in the shift register 52 in turn controls the selective application of signal voltage (+V) or ground (0) to signal electrodes 13 to generate induced electrostatic charge regions on surface 14 in accordance with the image data from logic 60.

After roller 51 has completed its movement from line $L_1$ to $L_y$ (with respective, cooperative line addresses of signal electrodes 13), control logic activates the application of ground potential to electrodes 12 and 13. A static, two-dimensional modulating field pattern of pixel portions is generated in the manner illustrated in FIG. 6. At this stage, illumination means 41 is activated to direct uniform light through the light valve array 50 and a static light image pattern is provided for display or recording at image station 47. Light source 41 need not be of linear geometry. For example, it can be a bright screen such as is used in light table devices. Also it should be noted that light valve array 50 can be viewed directly, as well as projected for display.

After the desired imaging operation is complete the charge pattern on surface 14 can be erased by moving grounded electrode 51 back across the surface. Alternatively, an A.C. or grid controlled corona dischrage device can be used to erase the field pattern. As shown in FIG. 8, the element 10 could include a photoconductive insulator layer 81 overlying surface 14, and the charge at surface 14 can be erased by flood illumination of the photoconductor 81. In such embodiment care must be taken that the photoconductive layer not interfere with field penetration into the volume of the panel as shown in FIG. 6.

Another alternative embodiment of modulating element 90 is shown in FIG. 9. In this embodiment the reference electrode configuration includes electrically conductive islands 97 intermediate linear electrodes 92. The other portions of the element 90 can be as previously described with respect to FIGS. 1–3. In the FIG. 9 embodiment the charge islands 97 improve the efficiency of charge injection onto surface 94.

Various other modifications will occur to those skilled in the art. For example, a high frequency AC voltage can be applied to line enable electrode 21 rather than ground. Similarly, the light-modulating element 10 can be moved under a stationary line enable electrode. Also a voltage +V can be applied to the line enable electrode and charge formed on surface 14 by addressing signal electrodes with ground potential (a no-charge address being effected by application of a +V potential to the signal electrode).

The invention has been described in detail with particular reference to preferred embodiments thereof, but it will be understood that variations and modifications can be effected within the spirit and scope of the invention.

What is claimed is:

1. A method for addressing an electro-optic modulator panel, having opposing first and second dielectric surfaces sandwiching a two-dimensional light modulation region, with a static electrical field pattern that corresponds to a two-dimensional image pattern, said method comprising:
   (a) applying a reference potential sequentially to successive lines of said first surface;
   (b) in synchronism with each such sequential reference potential application, applying signal potentials to discrete pixel address zones, located along a line of said second surface that is directly opposite such reference potential application, selectively in accordance with image information, whereby a two-dimensional electrostatic charge pattern corresponding to said image is formed on said one surface; and
   (c) thereafter, applying ground potential to: (1) portions of said first surface contiguous said charge pattern and (2) portions of said second surface directly opposite said charge pattern.

2. In a light-modulating device of the type including an electro-optic modulator panel having opposing first and second dielectric surfaces sandwiching a two-dimensional light modulation region, the improvement comprising:
   (a) means for applying a reference potential sequentially to successive lines of said first surface;
   (b) means, operative in synchronism with each sequential application of reference potential, for applying signal potentials to discrete pixel address zones, located along a line of said second surface that is directly opposite such reference potential application, selectively in accordance with image information, so as to form a two-dimensional electrostatic charge pattern corresponding to said image on said one surface; and
   (c) means, operative subsequent to such charge pattern formation, for applying ground potential to: (1) portions of said first surface contiguous said charge pattern and (2) portions of said second surface directly opposite said charge pattern.

3. An electro-optic device useful for producing a static, two-dimensional image, said device comprising:
   (a) an electro-optic panel having first and second electrically-insulative surfaces sandwiching an operative region that is adapted to imagewise modulate light in response to application of an imagewise electrical field pattern;
   (b) a plurality of linear reference electrodes located in a generally parallel and uniformly spaced relation proximate said first panel surface;
   (c) a plurality of linear signal electrodes located proximate said second panel surface in a generally parallel and interleaved relation with the normal projections through said panel of said reference electrodes;
   (d) line enable means, constructed for relative movement with respect to said first panel surface in a direction generally parallel to said signal electrodes, for applying a reference potential sequentially along successive lines, generally perpendicular to said signal electrodes, on said first electrode surface;
   (e) line address means for addressing said signal electrodes in synchronization with each reference potential application of said line enable means and in accordance with image line data; and
   (f) means for grounding reference and signal electrodes.

4. Electro-optic apparatus for producing a static, two-dimensional light image, said apparatus comprising:
(a) an electro-optic panel having first and second electrically-insulative surfaces sandwiching an operative region that is adapted to imagewise modulate light in response to application of an imagewise electrical field pattern;
(b) a plurality of linear reference electrodes located in a generally parallel and uniformly spaced relation proximate said first panel surface;
(c) a plurality of linear signal electrodes located proximate said second panel surface in a generally parallel and interleaved relation with the normal projections through said panel of said reference electrodes;
(d) line enable means, constructed for relative movement with respect to said first panel surface in a direction generally parallel to said signal electrodes, for applying a reference potential sequentially along successive lines, generally perpendicular to said signal electrodes, on said first electrode surface;
(e) line address means for addressing said signal electrodes in synchronization with each reference potential application of said line enable means and in accordance with image line data;
(f) means for grounding reference and signal electrodes; and
(g) means for directing uniform illumination along an optical path onto said electro-optic panel.

5. The invention defined in claim 4 wherein said panel is formed of PLZT ceramic material and further comprising first and second, respectively crossed, polarizing means sandwiching said panel along said optical path.

6. The invention defined in claim 2, 3 or 4 further including means for erasing imagewise field patterns from said first panel surface.

7. The invention defined in claim 2, 3 or 4 wherein said operative region of said panel is electrically-insulative.

8. The invention defined in claim 2, 3 or 4 wherein said line enable means is constructed for movement with a portion thereof in closely spaced or contacting relation with high resolution line portions of said first panel surface.

9. The invention defined in claim 8 wherein said contacting portion of said line enable means is resilient and electrically conductive.

* * * * *